United States Patent
Malka et al.

(10) Patent No.: US 8,965,602 B2
(45) Date of Patent: Feb. 24, 2015

(54) AEROLOGICAL PHENOMENA ALERT DEVICE FOR AN AIRCRAFT

(75) Inventors: Daniel Malka, Tournefeuille (FR); Jean-Charles Marin, Fonsorbes (FR); Engin Oder, Tournefeuille (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/596,985

(22) Filed: Aug. 28, 2012

(65) Prior Publication Data

US 2013/0079957 A1 Mar. 28, 2013

(30) Foreign Application Priority Data

Sep. 23, 2011 (FR) ...................................... 11 02889

(51) Int. Cl.
*G06F 7/70* (2006.01)
*G01S 13/95* (2006.01)
*G01S 7/00* (2006.01)

(52) U.S. Cl.
CPC ............... *G01S 13/953* (2013.01); *G01S 7/003* (2013.01)
USPC ............................. 701/14; 340/968; 701/120

(58) Field of Classification Search
CPC ...... G01C 23/00; G01C 5/005; G01C 23/005; G08G 5/0013
USPC ......... 701/9, 14, 120, 400; 340/968, 971, 995
See application file for complete search history.

(56) References Cited

U.S. PATENT DOCUMENTS

| | | | | |
|---|---|---|---|---|
| 5,111,400 A | * | 5/1992 | Yoder | 701/3 |
| 5,265,024 A | * | 11/1993 | Crabill et al. | 701/538 |
| 5,657,009 A | * | 8/1997 | Gordon | 340/968 |
| 6,199,008 B1 | * | 3/2001 | Aratow et al. | 701/120 |
| 6,480,120 B1 | * | 11/2002 | Meunier | 340/970 |
| 7,633,428 B1 | * | 12/2009 | McCusker et al. | 342/26 B |
| 2002/0039072 A1 | * | 4/2002 | Gremmert et al. | 340/945 |
| 2005/0278120 A1 | | 12/2005 | Manfred et al. | |
| 2009/0219197 A1 | * | 9/2009 | Bunch | 342/26 B |
| 2010/0174424 A1 | * | 7/2010 | Cornell et al. | 701/9 |
| 2010/0271239 A1 | * | 10/2010 | Kolcarek et al. | 340/971 |

* cited by examiner

*Primary Examiner* — Helal A Algahaim
*Assistant Examiner* — Shardul Patel
(74) *Attorney, Agent, or Firm* — Baker & Hostetler LLP

(57) ABSTRACT

An aerological phenomena alert device for an aircraft, which comprises onboard equipment capable of detecting meteorological phenomena, comprises: a module for collecting and storing meteorological data originating from the onboard equipment capable of detecting the meteorological phenomena, a module for creating a report from the collected meteorological data, a module for sending the report, a module for receiving reports sent by surrounding aircraft, a module for processing and consolidating the reports received, and for generating alerts when a report signals an aerological phenomenon, and a module for merging the data originating from aircraft and from meteorological stations, situated in a station on the ground and comprising a ground/air communication module for sending meteorological reports adapted to each aircraft according to its position in relation to an aerological phenomenon.

4 Claims, 3 Drawing Sheets

AEROLOGICAL PHENOMENA ALERT DEVICE FOR AN AIRCRAFT

CROSS-REFERENCE TO RELATED APPLICATION

This application claims priority to foreign French patent application No. FR 1102889, filed on Sep. 23, 2011, the disclosure of which is incorporated by reference in its entirety.

FIELD OF THE INVENTION

The invention relates to a cooperative onboard system providing navigational meteorological assistance to aircraft in flight.

BACKGROUND

According to the prior art, the meteorological information is supplied to the aircraft in flight via a voice connection from a station situated on the ground. There is no computerized means for transmitting information concerning the phenomena encountered by the aircraft.

Unless otherwise stipulated in the description or the figures, the symbols, acronyms and abbreviations have the French or English meaning as indicated in the table below:

| | | |
|---|---|---|
| METAR | METeorological Airport Report | Routine meteorological report written in aeronautical meteorological code. |
| TAF | Terminal Aerodrome Forecast (AIS) | (or Terminal Area Forecast) Meteorological forecast |
| SIGMET | SIGnificant METeorological Information | Information concerning the meteorological phenomena that may affect the safety of the aircraft. |
| GAMET | Ground Area METeorological Information | Area forecast for low-level flights |
| AIRMET | AIR METeorological Information | Plain language meteorological information significant for light aviation operating at 10 000 feet or below |
| GAFAR | General Aviation Forecast | General forecast for aviation. |
| TEMSI | Significant weather | French Meteorological Forecast Map |
| WINTEM | wind and temperature | Wind and temperature |
| VHF | Very High Frequency | Very high frequency used for short- and medium-distance communications between pilots and ground station personnel, the aeronautical VHF frequency band is reserved for aeronautics by international treaties |
| | 108.000 to 117.950 MHz | Aeronautical radio navigation (VOR and ILS) |
| | 117.975 to 137.000 MHz | Aeronautical traffic, VHF aeronautical band |
| | 121.5 MHz | Emergency frequency |
| ADIRS | Air Data Inertial Reference System | System for estimating the inertial and air parameters of the aeroplane |

The procedure for supplying meteorological information comprises the following steps:
acquisition of the meteorological information by the aeronautical meteorology service from different sources of information (ground meteorological stations, satellites and meteorological observation radar stations),
output of messages (METAR, TAF, SIGMET, GAMET, AIRMET, GAFAR, etc.) of maps and images: TEMSI-WINTEM, satellite and radar, weather front map; observed radio sounding aerology, regional tactical bulletin, local final bulletin;
provision of these data to the navigating crews of the aircraft, in flight, acquisition of onboard weather radar; limited in performance: no detection of turbulence in clear sky CAT, no vision beyond the first disturbance in front.

These days, the only possibility for a pilot of an aircraft to transmit a weather report concerning the meteorological disturbances encountered is to use a VHF link at a time when the workload of the pilots is high. The report concerning the weather encountered is consequently often made at the end of a flight, which is too late to provide real time assistance to other aircraft.

The meteorological information supplied to the crew is forecast information, generated from aerological modelling. It is not refreshed in flight and does not take account of very localized and violent weather phenomena which may occur beyond these forecasts. The difference between the meteorological forecasts and the real situation encountered in flight is fairly commonplace in navigation.

The highly localized and rapidly changing meteorological conditions are therefore not taken into account by the meteorological stations. These rapid changes are not transmitted to the aircraft in flight in an effective manner.

The in-flight observations of the meteorological situation in real time are therefore important and a great help in comprehending in real time the meteorology of the hazardous phenomena located on the air routes.

Systems have recently emerged that make it possible to collect observation information made available in order to allow for a comprehension of the real meteorological situation, located on the route or in the area in which aircraft are moving.

For example, the document US2002/0039072 discloses a method for collecting and processing these observation data by a station on the ground and broadcasting them to aircraft. However, this method has the drawback of being inoperative when the aircraft (supplying the observation data or receiving the processed data) cannot make contact with the station on the ground. Moreover, it requires a targeted return to the aircraft according to their position in the suspect area.

SUMMARY OF THE INVENTION

The invention aims to overcome the abovementioned problems by proposing an aerological phenomena alert device for aircraft, which takes into account, in real time, observations from aircraft and that operates without contact between a station on the ground and the aircraft.

To this end, the subject of the invention is an aerological phenomena alert device for an aircraft comprising onboard equipment capable of detecting the meteorological phenomena, the device comprising:

a module for collecting and storing meteorological data originating from the onboard equipment capable of detecting the meteorological phenomena, a module for creating a report from the collected meteorological data, a module for sending the report, a module for receiving reports sent by surrounding aircraft, a module for processing and consolidating the reports received, and for generating alerts when a report signals an aerological phenomenon, the processing and consolidation module comprising a data merging system (203) comprising a module for merging the data originating from aircraft and from meteorological stations, said merging module being situated in a station on the ground and comprising a ground/air communication module for sending meteorological reports adapted to each aircraft according to its position in relation to an aerological phenomenon.

Advantageously, the aerological phenomena alert device also comprises a diversion assistance module, with diversions based on the consolidated reports.

Advantageously, the aerological phenomena alert device also comprises an input module (201) enabling a crew piloting the aircraft to input observations concerning the meteorological conditions.

Advantageously, the aerological phenomena alert device also comprises an interactive dialogue module for conducting interactive dialogue with the other aircraft.

Advantageously, the aerological phenomena alert device comprises a module for interrogating at least one of the surrounding aircraft and collecting these meteorological data.

The invention is based on an onboard system in aircraft communicating between them and capable of processing meteorological data in sending and receiving modes.

The difficult or even hazardous meteorological conditions encountered by the aircraft are sent semi-automatically to the other aircraft situated in the same area or on the same route.

Thus, the invention brings into play the real time observation of the aircraft in flight confronted with these aerological phenomena. Their observations are broadcast to the surrounding aircraft.

The invention has the advantage of operating even in areas where there is no radio coverage with the ground.

BRIEF DESCRIPTION OF THE DRAWINGS

The invention will be better understood and other advantages will become apparent from reading the detailed description given as a non-limiting example and with the help of the figures in which.

DETAILED DESCRIPTION

The invention comprises the following functions in its simplest mode of operation:

observation and transmission, to other aircraft, of hazardous phenomena encountered by aircraft in flight, consolidation of these data by the aircraft, diversion assistance for the aircraft in flight.

The invention provides the aircraft with real time meteorological assistance, by using aerology observations obtained in real time by aircraft in the vicinity or en route on the same path.

The information concerning hazardous, and sometimes ephemeral, meteorological phenomena encountered by the aircraft in flight is used to cooperatively alert the aircraft using the same route and thus contribute to the safeguarding of these aircraft against these hazardous phenomena. The aircraft are therefore used as intercommunicating mobile weather stations.

The proposed device performs the services and processes by virtue of an onboard hardware and software system that supports the abovementioned functions.

The invention also relates to a method supported by a system capable of best combining a set of multi-sourced meteorological data (in particular, the weather messages supplied in real time by the onboard observations of aircraft in flight) using the data merging technology.

Figure 1:
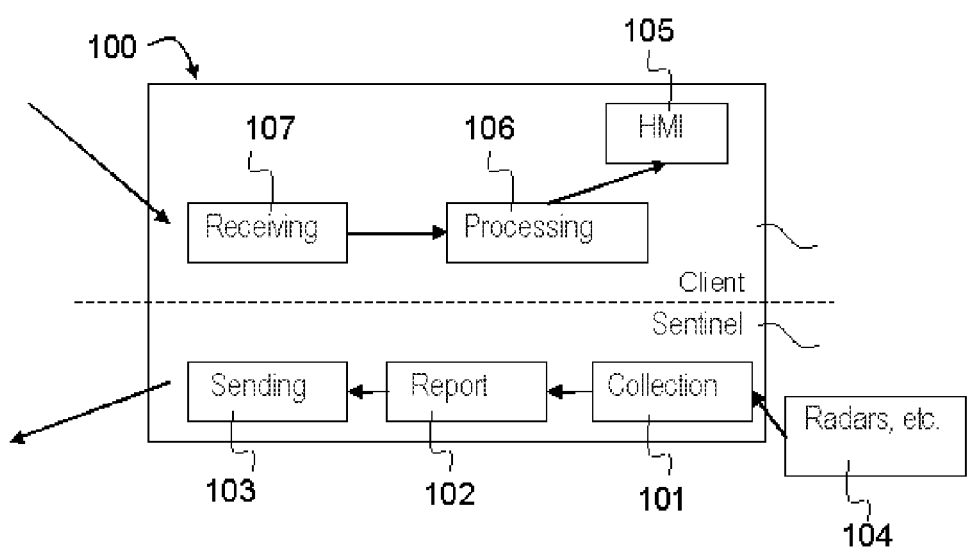
FIG. 1 represents a first variant embodiment of the device according to the invention.

FIG. 1 represents a first variant embodiment of the device according to the invention. The aerological phenomena alert device comprises:

a module for collecting and storing 101 meteorological data, the data being stored all along the path of the aircraft, by the onboard equipment capable of detecting the meteorological phenomena 104, a module for creating a report 102 from the collected data, a module for sending the report 103, a module for receiving reports 107 sent by other aircraft, a module for processing 106 the reports received and for generating alerts, when a report signals an aerological phenomenon.

The conventional onboard means which contribute to the detection of the meteorological phenomena 104 (radar, reactive and predictive wind shear detecting equipment, etc.) are pooled to collect the meteorological data.

Figure 2:
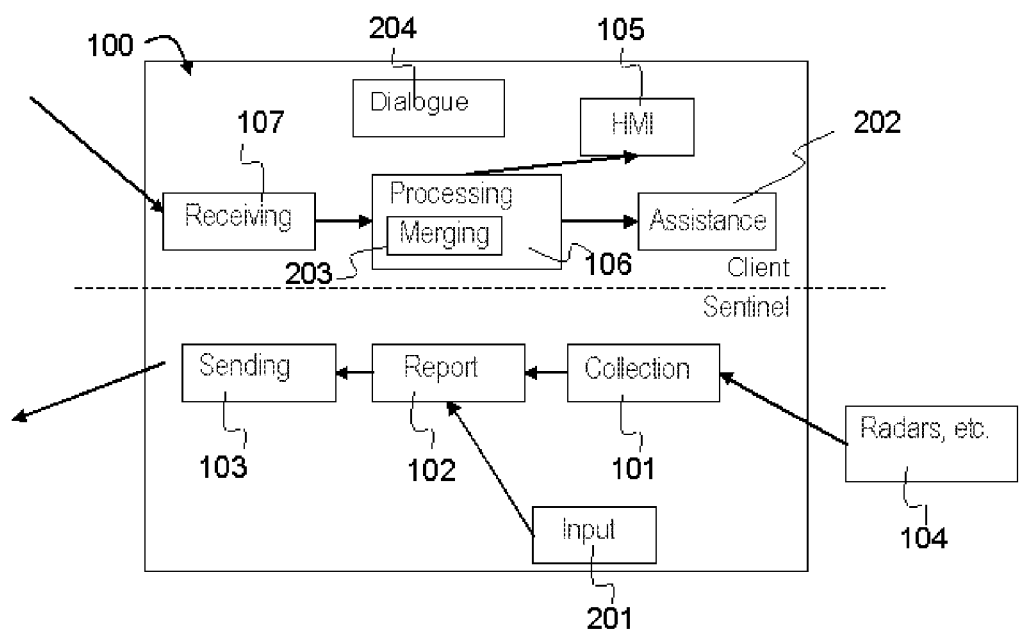
FIG. 2 represents a second variant embodiment of the device according to the invention.

FIG. 2 represents a second variant embodiment of the device according to the invention. In this second variant embodiment, the device also comprises a module for inputting observations 201 and comments from the crew concerning the meteorological conditions, the report then also comprising said observations and comments from the crew.

The collection and storage module 101 centralizes the information from the onboard equipment 104 and the onboard equipment concerned with the weather phenomena encountered.

The data are transmitted to the module for creating the reports 102.

The reports can be sent automatically or output by a member of the crew before being sent in order, for example, to annotate it with observations.

Advantageously, the device according to the invention comprises a human-machine interface (HMI) 105 comprising, for example, a dialogue system which receives and presents to the pilot the reports that have been received.

Advantageously, the device according to the invention comprises assistance for the pilots in their decisions to divert the aircraft 202 and supplying them with the aerological information observed on the route. The aircraft, faced with the disturbances reported on the route by one or more aeroplanes having observed these phenomena, are provided with data which enable them to take a reliable decision to divert into order to avoid these phenomena.

These coded meteorological data, for example in the form of an aviation weather standard, therefore originate firstly from the observation of other aircraft (also called sentinel aircraft) possibly complemented with the meteorological data from different ancillary sources, namely:

onboard equipment (weather radar, aerological and inertial sensors, etc.) and, possibly
a report from a meteorological station received from the ground.

Preferably, the HMI 105 comprises a dialogue and display terminal and a central computation unit for processing the data and providing storage internal or external to the terminal.

Advantageously, the dialogue terminal comprises, in its internal memory, the meteorological data received remotely from the other aircraft allowing, by display on the screen, the certain location of said meteorological phenomenon.

The dialogue terminal comprises a display screen and a keyboard, associated with a computer containing software for processing and presenting the data on the screen.

The device also has computer means for processing 106 the observation messages received from the device on board aeroplanes in flight (observer/sentinel) to consolidate their content through processing based on the merging of data 203 with other meteorological sources. The result is a data set consolidated by a merging algorithm.

The data merging that is used is the multi-source meteorological information processing technique. This makes it possible to merge multiple data relating to the meteorological phenomena in order to obtain a deeper appreciation thereof than the one obtained from all the sources with each considered in isolation.

Advantageously, the device also comprises an interactive and automatic dialogue module 204 for dialogue with the other aircraft.

Advantageously, this dialogue module allows for the observing aeroplane to be questioned by the client in order to recover, by "automatic" return, precise information concerning the current situation of the aircraft questioned, for example, by formulating questions such as: "Is the reported disturbance still active where you are?".

In practice, the different modules can be run on a single central processing unit (for example, a computer connected to a screen and a keyboard) handling the processing, the consolidation and the distribution of the data to the aeroplanes in flight at the same time as the service client function.

The terminal acquires and concentrates the data relating to the aerological situation by virtue of its central processing unit connected to the existing onboard equipment. It serves as dialogue interface with the pilots through its screen/keyboard. The terminal is also connected to communication devices through its central processing unit which enables it to transmit reports to the other aircraft.

The hardware architecture of the system is embedded and comprises an equipment item which operates both when the aircraft is observing (sentinel mode), and when it is receiving the alerts as client.

Each aircraft therefore hosts both observation equipment (sentinel mode) and equipment for using the information (client mode).

Figure 3:
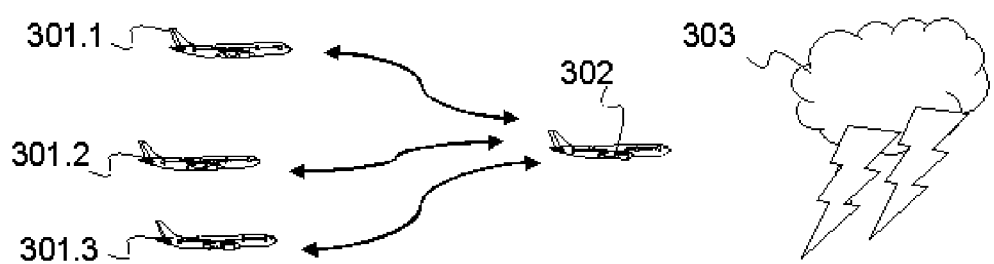
FIG. 3 illustrates the operation of the invention with a number of aircraft.

FIG. 3 illustrates the operation of the invention with a number of aircraft. A first aircraft 302, called "sentinel", broadcasts its report concerning the meteorological phenomena 303 via a communication means capable of being received by other aircraft 301.1, 301.2, 301.3 around its current position by using, for example, the VHF radio on a frequency dedicated to this use.

The "client" aircraft 301.1, 301.2, 301.3 listening on this channel, receive and process the information in real time for their use on the route. This mode of operation requires local processing on the client aircraft of the information originating from the sentinel aircraft 302, from its own sensors and from information that it has from elsewhere.

In our case, it is possible to distinguish two types of merging: sensors and data.

The first, essentially located on board the aeroplane, relates to the combining of information from different sensors such as the weather radar, the navigation systems, the inertial sensors, the infrared or visible camera, aerological laser sensor, ultraviolet sensor, ultrasonic sensor, etc. The various data from the sensors are processed by merging to extract therefrom a report concerning the present aerological situation of the observing aeroplane.

In producing it, a number of known methods can be used for the data merging. As an example, the data merging processing software module can be produced by the use of "expert" system techniques (neural network and inference engine). Once the module is developed, the assistance of a meteorology expert is necessary to finalize the knowledge base and the functions for apportioning the decision factors which devolve therefrom. The result is supplied to the pilot in the form of information which gives a percentage indication as to the justification for a decision to divert.

A number of data merging methods can be used to produce our device. One of the best known methods is described above.

The result of the analysis which is thus obtained is distributed through an air/ground communication means to the "client" aeroplanes in flight and in a way that is targeted in relation to their respective positions vis-à-vis the disturbance.

According to one embodiment of the invention, the device comprises a module for interrogating at least one of the surrounding aircraft and collecting these meteorological data. The "client" aeroplane can question a "sentinel" or any other aeroplane that is a member of the service in order to know its meteorological situation at a given instant.

The invention claimed is:

1. An aerological phenomena alert device for an aircraft comprising onboard equipment capable of detecting meteorological phenomena, the device comprising:
a module for collecting and storing meteorological data originating from:
the onboard equipment capable of detecting the meteorological phenomena, said onboard equipment comprising at least one of a weather radar, a navigation system, an inertial sensor, an infrared camera, a visible camera, an aerological laser sensor, an ultraviolet sensor, or an ultrasonic sensor;
surrounding aircraft using a same route; and
a meteorological station on the ground and comprising a ground/air communication module,
a module for creating a report from the collected meteorological data,
a module for sending the report, the report being sent automatically or manually,
an input module enabling a crew piloting the aircraft to input observations concerning meteorological conditions;
a module for receiving reports sent by surrounding aircraft using the same route, and
a module for processing and consolidating the reports received, and for generating alerts when at least one received report signals an aerological phenomenon;
wherein the processing and consolidation module comprises a data merging system comprising a module for merging the data originating from the aircraft, from the surrounding aircraft reporting, and from meteorological stations on the ground and comprising a ground/air communication module making it possible to send meteorological reports adapted to each aircraft according to its position in relation to an aerological phenomenon.

2. The aerological phenomena alert device according to claim 1, further comprising a diversion assistance module, with diversions based on the consolidated reports.

3. The aerological phenomena alert device according to claim 1, further comprising an interactive dialogue module for conducting interactive dialogue with the other aircraft.

4. The aerological phenomena alert device according to claim 1, further comprising a module for interrogating at least one of the surrounding aircraft and collecting these meteorological data.

* * * * *